(12) United States Patent
Røynestad

(10) Patent No.: US 9,850,068 B2
(45) Date of Patent: Dec. 26, 2017

(54) CARRYING HANDLE FOR A BUILDING COMPONENT

(71) Applicants: Frank Rob, Kvinesdal (NO); Tom Toralv Roynestad, Kvinesdal (NO)

(72) Inventor: Tom Toralv Røynestad, Kvinesdal (NO)

(73) Assignees: Tom Toralv Roynestad, Kvinesdal (NO); Frank Rob, Kvinesdal (NO)

( * ) Notice: Subject to any disclaimer, the term of this patent is extended or adjusted under 35 U.S.C. 154(b) by 0 days.

(21) Appl. No.: 15/107,296

(22) PCT Filed: Jan. 7, 2015

(86) PCT No.: PCT/NO2015/050002
§ 371 (c)(1),
(2) Date: Jun. 22, 2016

(87) PCT Pub. No.: WO2015/142182
PCT Pub. Date: Sep. 24, 2015

(65) Prior Publication Data
US 2016/0340123 A1 Nov. 24, 2016

(30) Foreign Application Priority Data
Jan. 24, 2014 (NO) .................................... 20140082

(51) Int. Cl.
*B65G 7/12* (2006.01)
*E04F 21/00* (2006.01)

(52) U.S. Cl.
CPC ............ *B65G 7/12* (2013.01); *E04F 21/0015* (2013.01)

(58) Field of Classification Search
CPC .... B65G 7/12; E04F 21/0007; E04F 21/0015; E04F 21/142
USPC .............. 294/15, 92, 145; 414/10; 52/125.2, 52/125.3; 16/422
See application file for complete search history.

(56) References Cited

U.S. PATENT DOCUMENTS 2,193,054 A * 3/1940 Bowen ...................... B25B 9/00
294/15
2,456,917 A * 12/1948 Cheek ...................... B65G 7/12
29/239

(Continued)

FOREIGN PATENT DOCUMENTS

DE 9419168 3/1995
DE 29717201 12/1997

(Continued)

OTHER PUBLICATIONS

Norwegian Search Report, Norwegian Patent Application No. 20140082, dated Aug. 19, 2014.

(Continued)

*Primary Examiner* — Dean J Kramer
(74) *Attorney, Agent, or Firm* — Andrus Intellectual Property Law, LLP

(57) ABSTRACT

A detachable carrying-handle arrangement is for a building component, especially a window or a door including a frame which is to be fixed in a supporting structure surrounding an opening in a building structure. The carrying-handle arrangement includes a grip portion connected to a plate-shaped attachment portion which is provided with at least two cut-outs which is arranged to lockingly engage with a fixing bolt.

9 Claims, 4 Drawing Sheets

(56) References Cited

U.S. PATENT DOCUMENTS

| | | | | |
|---|---|---|---|---|
| 2,606,054 | A | * | 8/1952 | Cole .................. B25B 9/00 16/422 |
| 4,798,286 | A | * | 1/1989 | Muscanelli .......... B65D 71/504 206/150 |
| 5,184,862 | A | * | 2/1993 | Theobald ................ B65G 7/12 16/422 |
| 5,501,322 | A | * | 3/1996 | Drebushenko ......... B65D 71/50 206/147 |
| 5,695,230 | A | * | 12/1997 | Thompson ............... B65G 7/12 254/131 |
| 6,823,563 | B2 | * | 11/2004 | Robinson .............. E05B 35/008 16/422 |
| 7,003,917 | B2 | * | 2/2006 | Hetherington ........... B65G 7/12 294/15 |
| 7,311,343 | B2 | * | 12/2007 | Callebresi ................. A45F 5/10 294/15 |
| 2013/0199110 | A1 | * | 8/2013 | Sias ......................... B66C 1/62 52/125.2 |

FOREIGN PATENT DOCUMENTS

| | | |
|---|---|---|
| DE | 202004003211 | 6/2004 |
| DE | 202009006816 | 9/2010 |
| EP | 0398054 | 11/1990 |
| FR | 2 977 870 * | 1/2013 |
| FR | 2977870 | 1/2013 |

OTHER PUBLICATIONS

International Search Report, PCT/NO2015/050002, dated May 13, 2015.
Written Opinion, PCT/NO2015/050002, dated May 13, 2015.
International Preliminary Report on Patentability, PCT/NO2015/050002, dated Jan. 4, 2016.
Written Opinion, PCT/NO2015/050002, dated Jan. 8, 2016.

* cited by examiner

CARRYING HANDLE FOR A BUILDING COMPONENT

CROSS-REFERENCE TO RELATED APPLICATIONS

This application is the U.S. national stage application of International Application PCT/NO2015/050002, filed Jan. 7, 2015, which international application was published on Sep. 24, 2015, as International Publication WO 2015/142182 in the English language. The international application is incorporated herein by reference, in entirety. The international application claims priority to Norwegian Patent Application No. 20140082, filed Jan. 24, 2014, which is incorporated herein by reference, in entirety.

FIELD

The invention relates to a detachable carrying-handle arrangement for a building component, especially a window or a door including a frame, which is to be fixed to a supporting structure surrounding an opening in a building structure.

BACKGROUND

Building components, like windows and doors, can be both voluminous and heavy, and especially in rehabilitation, in which the transport must, to a great degree, go through entrance portions, corridors, stairways and door openings in the building under rehabilitation, building components of this kind are difficult to handle, not least because of it being difficult to find good portions which are good for gripping.

SUMMARY

The invention has for its object to remedy or reduce at least one of the drawbacks of the prior art or at least provide a useful alternative to the prior art.

The object is achieved through features which are specified in the description below and in the claims that follow.

The invention provides a carrying-handle arrangement arranged for temporary attachment to a building component, especially to an external side face of a door frame or window frame. From a bow-shaped grip portion, there extends an attachment portion, the grip portion and the attachment portion lying substantially in the same plane. The attachment portion is provided with at least one, preferably two bolt holes for receiving fixing bolts arranged to be fixed to the building component. The bolt holes have a keyhole shape, for example, to enable the carrying-handle arrangement to be slipped over the head of the fixing bolt when the head of the fixing bolt lies with a slight clearance to said side face.

The fixing bolt is preferably an adjusting bolt arranged in a hole extending through the frame, the adjusting bolt being adjustable, when the building component is being fitted, into abutment against the surrounding building structure to which the building component is to be fixed. The adjustment is typically done with the use of a tool, which engages with a recess in an end portion of the adjusting bolt opposite the head of the bolt. When key-hole bolt holes or the like are used in the attachment portion, the carrying-handle arrangements may remain attached to the building component until it is positioned in the building structure, for example a window being positioned in the wall opening. Then the adjusting bolts holding the carrying-handle arrangements are unscrewed a little so that the carrying-handle arrangements can be slipped off the adjusting bolts and reused. Alternatively, the periphery of the bolt head may be arranged for engagement with a tool, for example a hexagonal head, which is gripped by an open-end spanner.

The attachment portion of the carrying-handle arrangement is preferably formed from a flexible plate material. Thereby, when required, the grip portion may be forced inwards towards the centre of the building component, which is an advantage where a double set of carrying-handle arrangements is used to arrange grip portions on either side of the frame. Thereby the grip portions, which are lying on the outside of the window during the installation of a window, will not be an obstruction when the window is being placed in the wall opening.

The carrying-handle arrangement is preferably mirror-symmetrical around a centre plane through the attachment portion, for the carrying-handle arrangement, when the bolt holes have a keyhole shape or its equivalent, to be usable in all relevant positions on the building component.

The invention relates more specifically to a detachable carrying-handle arrangement for a building component, especially a window or a door including a frame, which is to be fixed to a supporting structure surrounding an opening in a building structure, characterized by the carrying-handle arrangement including a bow-shaped grip portion projecting from a side edge of a plate-shaped attachment portion, the grip portion and the attachment portion laying substantially in the same plane, wherein the attachment portion is provided with at least one cut-out which is arranged to lockingly engage with a fixing bolt arranged in an external side face of the frame, and wherein the bow-shaped grip portion of the carrying-handle arrangement, when in a position of application, is projecting outwards from an external edge face of the building component, the plate-shaped attachment portion being flexible and allowing the grip portion to be forced inwards towards the centre of the building component.

The cut-out may include a first, in the position of application upper cut-out portion and a second, in the position of application lower cut-out portion, the second cut-out portion having a smaller transverse dimension than the first cut-out portion.

The carrying-handle arrangement may be mirror-symmetrical around a central plane through the cross section of the attachment portion. An advantage of this is that the same embodiment of the carrying-handle arrangement can be used in all relevant positions on the building component.

The fixing bolt may be a frame-adjustment bolt, which extends from the external side face of the frame into a through-going bolt hole, the frame-adjustment bolt being provided with an end recess arranged for engagement with an adjusting tool extending, in an active position, in through the free mouth of the bolt hole. An advantage of this is that the carrying-handle arrangement may be released after the building component has been placed in the opening, even if there is little clearance between the frame and the supporting structure.

The attachment portion may be elastically yielding. An advantage of this is that a grip portion projecting outwards from an external edge face of the building component can yield inwards towards the centre of the building component when the building component is to be inserted into an opening with little clearance between the frame and the supporting structure.

A second grip portion may be arranged on the attachment portion opposite the grip portion. An advantage of this is that the heads of the fixing bolts project minimally from the frame when the building component is so heavy that it will have to be carried by persons positioned on both sides of the building component.

BRIEF DESCRIPTION OF THE DRAWINGS

In what follows, an example of a preferred embodiment is described, which is visualized in the accompanying drawings in which.

DETAILED DESCRIPTION OF THE DRAWINGS

Figure 1:
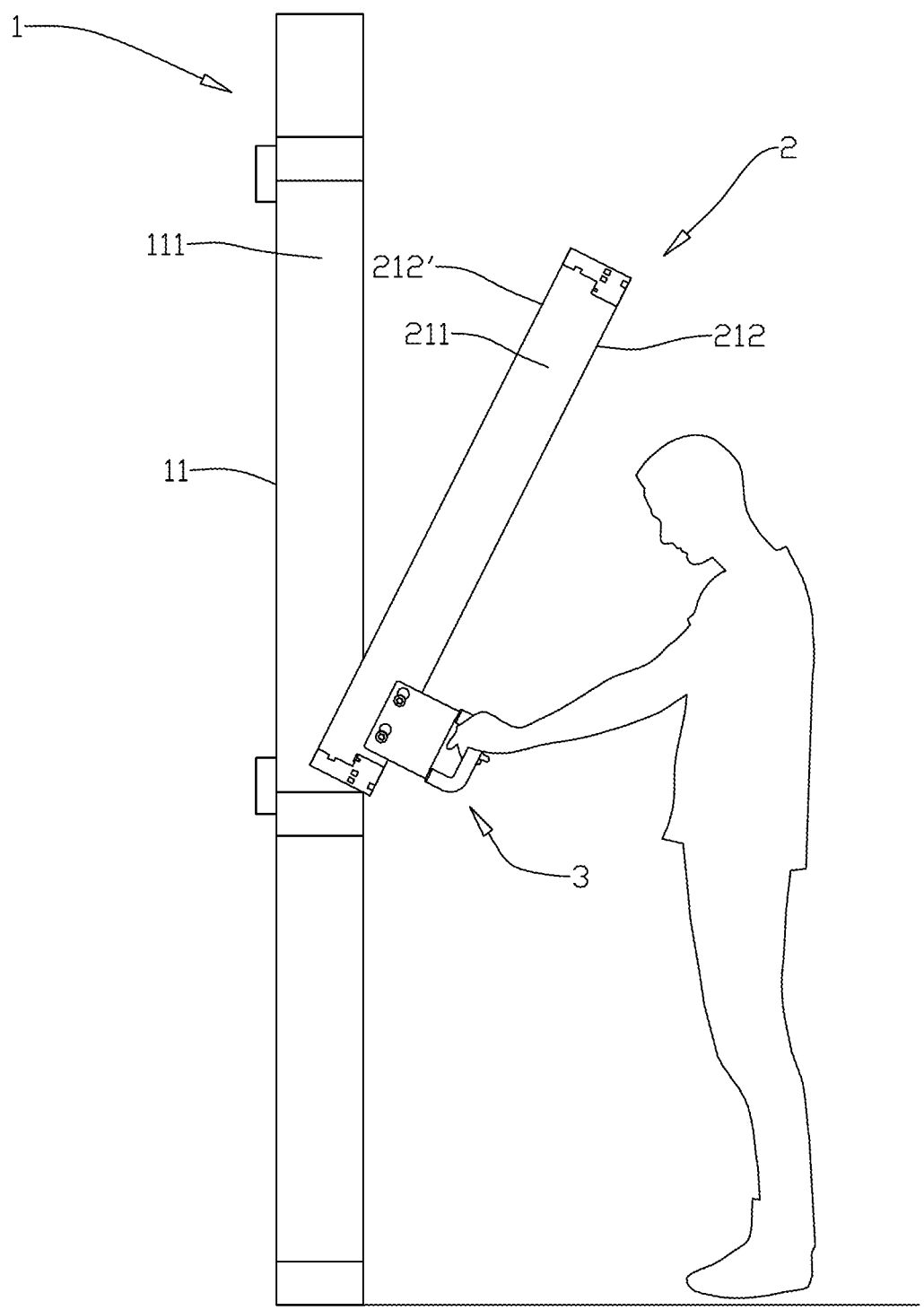
FIG. 1 shows a side view of a building component in the form of a window partially inserted into a building structure and provided with carrying-handle arrangements according to the invention, projecting inwards from a lower side-face portion of the window frame.

Reference is first made to FIG. 1 in which the reference numeral 1 indicates a building structure provided with an opening 11 arranged to receive a building component 2, shown as a window here, and encircled by a supporting structure 111 arranged to receive the fixing means of the building component 2, several frame-adjustment bolts 22 among other things. The frame-adjustment bolts 22 are provided with bolt heads 221 and are screwed into bolt holes 214 extending through the frame 21 of the building component 2 from the external side face 211 of the frame 21, the frame-adjustment bolts 22 being provided, in end portions remote from the bolt heads, with recesses, not shown, arranged for engagement with an adjusting tool 4 inserted through bolt-hole mouths 214' in the internal side face 211' of the frame 21.

The building component 2 comprises an inwards facing edge face 212 and an outwards facing edge face 212'.

A carrying-handle arrangement 3 is attached to a lower portion of each external frame side face 211 by means of a selection of frame-adjustment bolts 22. Alternatively, the carrying-handle arrangement 3 may be attached by means of ordinary fixing bolts (not shown) which do not have any other function than holding the carrying-handle arrangement 3.

Figure 2:
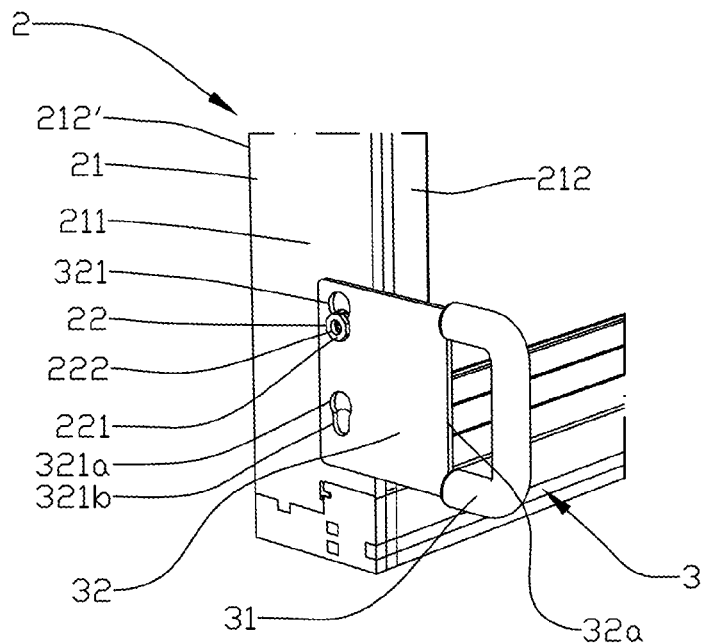
FIG. 2 shows, in perspective and on a larger scale, a first carrying-handle arrangement attached to a lower side-face portion of the window frame, a frame-adjustment bolt having been removed for the sake of exposition.
Figure 3:
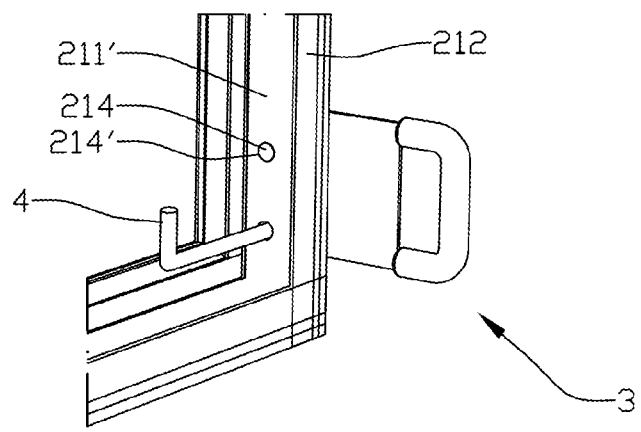
FIG. 3 shows a second, opposite carrying-handle arrangement.

Reference is now made especially to FIGS. 2 and 3. The carrying-handle arrangement 3 includes a grip portion 31 formed as a bow-shaped handle projecting from an outer side edge 32a of a plate-shaped attachment portion 32. The attachment portion 32 is provided with two cut-outs 321 arranged to receive the heads 221 of frame-adjustment bolts 22 for locking engagement. A first cut-out portion 321a is wider than a second cut-out portion 321b, the first cut-out portion 321a being arranged, in a position of application, above the second cut-out portion 321b, for example in the shape of a keyhole as shown in FIG. 2, in order thereby to provide space for the bolt head 221 to be passed through in the first cut-out portion 321a and prevent the bolt head 221 from passing when the frame-adjustment bolt 22 extends through the second cut-out portion 321b. It is obvious that other cut-out shapes lie within the scope of the invention as well. The distance between the cut-outs 321 is adapted to the distance between two adjacent frame-adjustment bolts 22. In FIG. 2, a lower frame adjustment bolt has been removed for the sake of exposition.

When the carrying-handle arrangement 3 is being fitted to the external side face 211 of the frame 21, the carrying-handle arrangement 3 is oriented in such a way that the narrow portion of the cut-out 321 is facing downwards. The attachment portion 32 is brought in over the corresponding bolt heads 221, which, at this stage, are lying with a clearance to the external side face 211. The frame-adjustment bolts or the fixing bolts 22 are tightened to prevent the carrying-handle arrangement 3 from being displaced in the cut-outs 321. The operation is repeated to fix further carrying-handle arrangements 3 to other portions of the frame 21. The building component 2 has now been prepared to be moved, the carrying-handle arrangements 3 providing handles well suited for lifting the building component 2.

When the building component 2 has been positioned in the opening 11 of the building structure 1 and secured, the carrying-handle arrangement 3 can easily be removed by the fixing bolts 22 being loosened and the attachment portion 32 being pulled out of engagement behind the bolt heads 221. At this stage, the adjusting feature of the frame-adjustment bolt 22 particularly comes into its own, as it can be loosened by the engagement of the adjusting tool 4 with the recess, not shown, of the frame-adjustment bolt 22 via the bolt-hole mouth 214' completely independently of the clearance between the frame 21 and the adjacent supporting structure 111.

Figure 4:
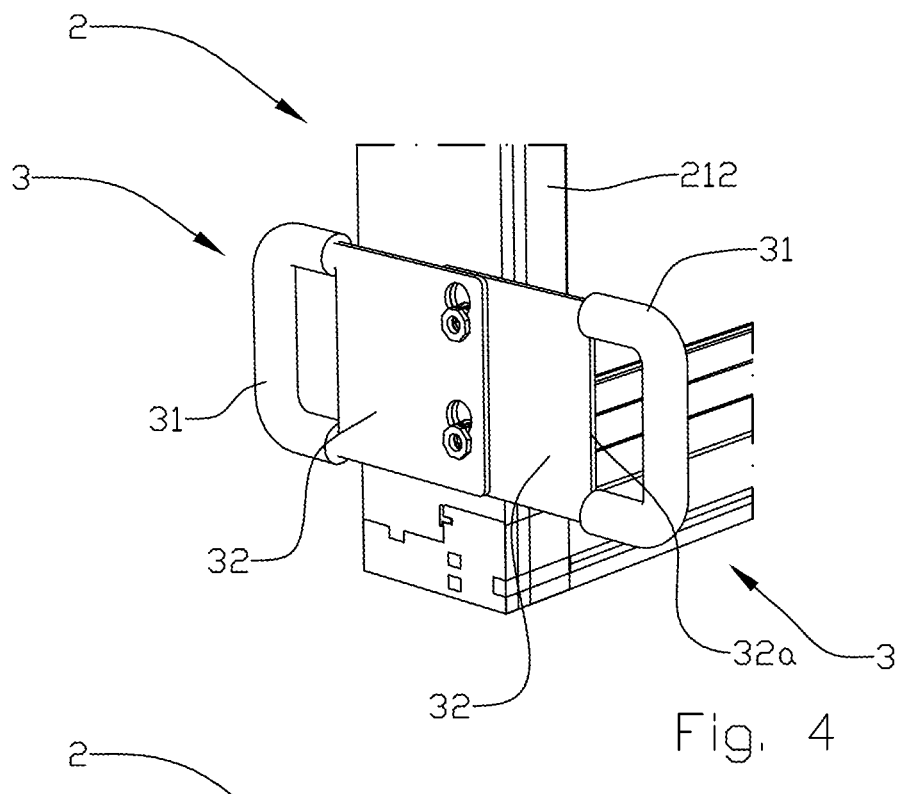
FIG. 4 shows two carrying-handle arrangements projecting in opposite directions, arranged on the same fixing bolts.

When required, two carrying-handle arrangements 3 may be attached to the same set of fixing bolts 22, see FIG. 4. Owing to the flexibility of the attachment portion 32, a grip portion 31' projecting outwards may be pressed towards the centre of the building component during the insertion of the building component 2 into its opening 11, in order not to prevent the fitting of the building component 2.

Figure 5:
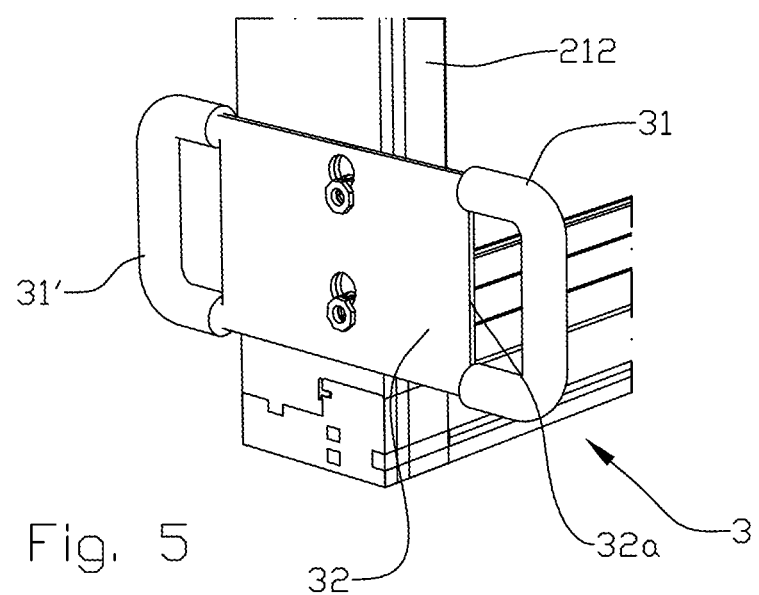
FIGS. 5 and 6 show a carrying-handle arrangement provided with two grip portions.
Figure 6:
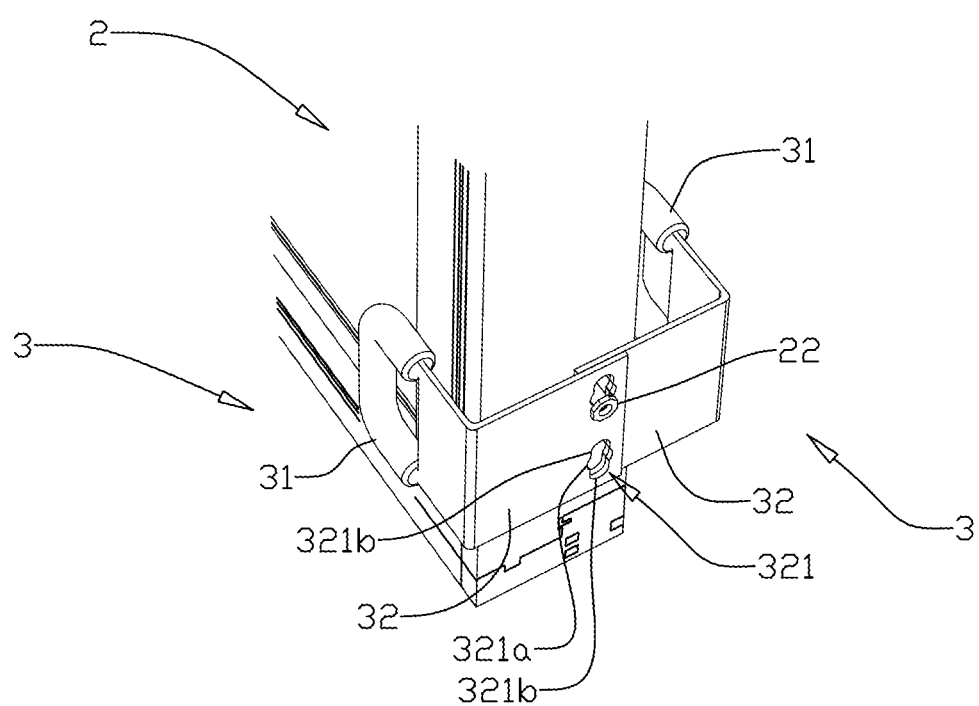

Alternatively, the carrying-handle arrangement 3 may be provided with two grip portions 31, 31' projecting in opposite direction, see FIG. 5, one at each opposite outer side edge 32a of an attachment portion 32, which, in this embodiment, has been extended in relation to an attachment portion 32 provided with one grip portion 32 according to FIGS. 1-4.

The invention claimed is:

1. A detachable carrying-handle arrangement for a building component comprising a frame, which is to be fixed to a supporting structure surrounding an opening in a building structure, the carrying-handle arrangement comprising a bow-shaped grip portion projecting from an outer side edge of a plate-shaped attachment portion, the bow-shaped grip portion and the plate-shaped attachment portion lying substantially in the same plane, wherein the plate-shaped attachment portion is provided with at least two cut-outs, which are each arranged to lockingly engage with an adjustable fixing bolt arranged in an external side face of the frame, and wherein the bow-shaped grip portion of the carrying-handle arrangement, when in a position of application, is projecting outwards relative to an external edge face of the building component, the plate-shaped attachment portion being flexible and allowing the grip portion to be forced inwards towards a center of the building component, the at least two cut-outs being located in line along a common axis which is parallel with the outer side edge from which the bow-shaped grip portion projects;

wherein each of the at least two cut-outs includes a first, in the position of application, upper cut-out portion and a second, in the position of application, lower cut-out portion, the second lower cut-out portion having a smaller transverse dimension than the first upper cut-out portion, the first upper cut-out portion being arranged, in the position of application, above the second lower cut-out portion; and wherein the plate-shaped attachment portion has continuously flat front and rear surfaces.

2. The detachable carrying-handle arrangement according to claim 1, wherein the carrying-handle arrangement is mirror-symmetrical around a central plane through the cross section of the plate-shaped attachment portion.

3. The detachable carrying-handle arrangement according to claim 1, wherein the fixing bolt is a frame-adjustment bolt extending from the external side face of the frame into a through-going bolt hole formed therein, and the frame-adjustment bolt is provided with an end recess arranged for engagement with an adjusting tool extending, in an active position, in through a free mouth of the bolt hole.

4. The detachable carrying-handle arrangement according to claim 1, wherein the plate-shaped attachment portion is elastically yielding.

5. The detachable carrying-handle arrangement according to claim 1, wherein the at least two cut-outs are unconnected with each other and commonly configured and oriented relative to one another along the common axis.

6. A detachable carrying-handle arrangement for a building component comprising a frame, which is to be fixed to a supporting structure surrounding an opening in a building structure, the carrying-handle arrangement comprising a bow-shaped grip portion projecting from an outer side edge of a plate-shaped attachment portion, the bow-shaped grip portion and the plate-shaped attachment portion lying substantially in the same plane, wherein the plate-shaped attachment portion is provided with at least two cut-outs, which are each arranged to lockingly engage with an adjustable fixing bolt arranged in an external side face of the frame, and wherein the bow-shaped grip portion of the carrying-handle arrangement, when in a position of application, is projecting outwards relative to an external edge face of the building component, the plate-shaped attachment portion being flexible and allowing the grip portion to be forced inwards towards a center of the building component, the at least two cut-outs being located in line along a common axis which is parallel with the outer side edge from which the bow-shaped grip portion projects;

wherein each of the at least two cut-outs includes a first, in the position of application, upper cut-out portion and a second, in the position of application, lower cut-out portion, the second lower cut-out portion having a smaller transverse dimension than the first upper cut-out portion, the first upper cut-out portion being arranged, in the position of application, above the second lower cut-out portion; and wherein a second grip portion is arranged on the plate-shaped attachment portion opposite the bow-shaped grip portion.

7. A detachable carrying-handle arrangement for a building component comprising a frame, which is to be fixed to a supporting structure surrounding an opening in a building structure, the carrying-handle arrangement comprising a bow-shaped grip portion projecting from a side edge of a plate-shaped attachment portion, the bow-shaped grip portion and the plate-shaped attachment portion lying substantially in the same plane, wherein the plate-shaped attachment portion is provided with at least two cut-outs, which are each arranged to lockingly engage with a fixing bolt arranged in an external side face of the frame, and wherein the bow-shaped grip portion of the carrying-handle arrangement, when in a position of application, is projecting outwards relative to an external edge face of the building component, the plate-shaped attachment portion being flexible and allowing the bow-shaped grip portion to be forced inwards towards a center of the building component, wherein a second grip portion is arranged on the plate-shaped attachment portion opposite the bow-shaped grip portion.

8. A detachable carrying-handle arrangement for a building component comprising a frame, which is to be fixed to a supporting structure surrounding an opening in a building structure, the carrying-handle arrangement comprising a bow-shaped grip portion projecting from an outer side edge of a plate-shaped attachment portion, the bow-shaped grip portion and the plate-shaped attachment portion lying substantially in the same plane, wherein the plate-shaped attachment portion is provided with at least two cut-outs, which are each arranged to lockingly engage with an adjustable fixing bolt arranged in an external side face of the frame, and wherein the bow-shaped grip portion of the carrying-handle arrangement, when in a position of application, is projecting outwards relative to an external edge face of the building component, the plate-shaped attachment portion being flexible and allowing the bow-shaped grip portion to be forced inwards towards a center of the building component, the at least two cut-outs being located in line along a common axis which is parallel with the outer side edge from which the bow-shaped grip portion projects, wherein a second grip portion is arranged on the plate-shaped attachment portion opposite the bow-shaped grip portion.

9. A method of handling a building component during installation thereof in a supporting structure surrounding an opening in a building structure, the method comprising the steps of:

a) providing a building component frame having an external side face structure, an outwardly-facing edge face structure connected thereto and a bolt arrangement screw threaded into the building component frame and having bolt head structure projecting with a clearance from the external side face structure of the building component frame;

b) providing a carrying handle arrangement having a plate-shaped attachment portion provided with an outer side edge, and a bow-shaped grip portion projecting therefrom, the bow-shaped grip portion and the plate-shaped attachment portion lying substantially in the same plane, the plate-shaped attachment portion being formed with a cut-out formation sized to movably receive and retain the bolt head structure projecting from the external side face structure of the building component frame;

c) placing the plate-shaped attachment portion adjacent the external side face structure of the building component frame and over the bolt head structure such that the bolt head structure passes into and through the cut-out formation;

d) tightening the bolt arrangement to fix the plate-shaped attachment portion against the external side face structure of the building component frame with the bow-shaped grip portion projecting outwardly relative to the outwardly-facing edge face structure of the building component frame;

e) using the carrying handle arrangement fixed to the external side face structure of the building component frame, positioning the building component frame for separate securement within the supporting structure of the building structure; and f) loosening the bolt arrangement to enable removal of the carrying handle arrangement from the bolt head structure and building component frame.

* * * * *